US010506079B2

(12) United States Patent
LaVine (10) Patent No.: US 10,506,079 B2
(45) Date of Patent: Dec. 10, 2019

(54) PACKET COMPRESSION

(71) Applicant: ARM LIMITED, Cambridge (GB)

(72) Inventor: Mark Gerald LaVine, Austin, TX (US)

(73) Assignee: ARM Limited, Cambridge (GB)

( * ) Notice: Subject to any disclaimer, the term of this patent is extended or adjusted under 35 U.S.C. 154(b) by 78 days.

(21) Appl. No.: 15/704,343

(22) Filed: Sep. 14, 2017

(65) Prior Publication Data

US 2019/0082036 A1 Mar. 14, 2019

(51) Int. Cl.
| H04L 29/06 | (2006.01) |
| H04L 12/751 | (2013.01) |
| H04L 12/26 | (2006.01) |
| H04L 12/24 | (2006.01) |

(52) U.S. Cl.
CPC ............. *H04L 69/04* (2013.01); *H04L 43/08* (2013.01); *H04L 43/0894* (2013.01); *H04L 43/16* (2013.01); *H04L 45/02* (2013.01); *H04L 41/0631* (2013.01)

(58) Field of Classification Search
None
See application file for complete search history.

(56) References Cited

U.S. PATENT DOCUMENTS

| 2001/0054175 | A1  | 12/2001 | Watanabe |
| 2004/0125817 | A1* | 7/2004  | Miyazaki ............. H04W 28/06 370/411 |
| 2007/0094645 | A1  | 4/2007  | Nardini et al. |
| 2008/0288741 | A1  | 11/2008 | Lee et al. |
| 2012/0066552 | A1  | 3/2012  | Gilkerson et al. |
| 2013/0151485 | A1* | 6/2013  | Kim ........................ G06F 16/23 707/693 |
| 2013/0177020 | A1* | 7/2013  | Miyazaki ............... H04L 45/24 370/392 |
| 2015/0234730 | A1* | 8/2015  | Puthuff ............... G06F 11/3636 717/128 |
| 2018/0139131 | A1* | 5/2018  | Ignatchenko ........... H04L 43/10 |
| 2018/0145910 | A1* | 5/2018  | Mester ................ H04L 45/7453 |

OTHER PUBLICATIONS

Combined Search and Examination Report dated Mar. 7, 2019 in GB Application No. 1814317.2, 11 pages.

* cited by examiner

*Primary Examiner* — Ayanah S George
(74) *Attorney, Agent, or Firm* — Nixon & Vanderhye P.C.

(57) ABSTRACT

An apparatus is provided, which includes monitor circuitry for monitoring the behaviour of processing circuitry and for generating at least a packet indicating the behaviour. Compare circuitry compares the packet to a base packet and generates a delta packet based on the comparison. Compress circuitry forms a compressed packet on the basis of the delta packet. Output circuitry outputs the compressed packet and update circuitry updates the base packet in dependence on one or more triggers.

20 Claims, 5 Drawing Sheets

PACKET COMPRESSION

TECHNICAL FIELD

The present disclosure relates to data processing. More particularly, it relates to compression of packets.

DESCRIPTION

Trace data can be generated in order to monitor behaviour of a data processing circuit. Often it is necessary for a large amount of trace data to be generated in order to determine the root cause of behaviour by the processing circuitry. However, there is usually a bandwidth limit regarding the rate at which trace data can be output. If the bandwidth limit is exceeded then there could be a delay until the trace data is output and if the bandwidth limit is exceeded for a period of time, then the trace data could even be lost. It is desirable to avoid this situation.

SUMMARY

Viewed from a first example configuration, there is provided an apparatus comprising: monitor circuitry to monitor a behaviour of processing circuitry and to generate at least a packet indicating said behaviour; compare circuitry to compare said packet to a base packet and to generate a delta packet based on said comparison; compress circuitry to form a compressed packet on the basis of said delta packet; output circuitry to output said compressed packet; and update circuitry to update said base packet in dependence on one or more triggers.

Viewed from a second example configuration, there is provided a method comprising: monitoring a behaviour of processing circuitry; generating at least a packet indicating said behaviour; performing a comparison between said packet and a base packet; generating a delta packet based on said comparison; compressing said delta packet to form a compressed packet; outputting said compressed packet; and updating said base packet in dependence on one or more triggers.

Viewed from a third example configuration, there is provided an apparatus comprising: means for monitoring a behaviour of processing circuitry; means for generating at least a packet indicating said behaviour; means for performing a comparison between said packet and a base packet; means for generating a delta packet based on said comparison; means for compressing said delta packet to form a compressed packet; means for outputting said compressed packet; and means for updating said base packet in dependence on one or more triggers.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: monitor circuitry to monitor a behaviour of processing circuitry and to generate at least a packet indicating said behaviour; compare circuitry to compare said packet to a base packet and to generate a delta packet based on said comparison; compress circuitry to form a compressed packet on the basis of said delta packet; output circuitry to output said compressed packet; and update circuitry to update said base packet in dependence on one or more triggers.

The above solution provides a compression mechanism for reducing the amount of data that is used in data packets such as trace data packets, without removing the amount of information represented by those packets. In general, the process is designed to select a base (basis) packet, which might initially be the first packet to be output. Later packets are compared to the base packet in order to form delta packets, which represent a change between the later packet and the base packet. Since compression is performed, fewer bytes need to be transmitted and so the same information can be transmitted while reducing the bandwidth. The base packet is changed in response to one or more triggers. By allowing the base packet to be changed, it is possible for an improved level of compression to be achieved overall.

In some embodiments, said compress circuitry is adapted to identify removable bytes from bytes that make up said delta packet, to remove said removable bytes, and to add instructional bytes to indicate how said removable bytes can be restored, to form said compressed packet. Any "removable" bytes in the delta packet having a particular characteristic are removed. The characteristic is such that by the addition of a small number of instructional bytes to the delta packet, the removable packets can be restored. The resulting packet can then be output. At a receiving end, a receiver can perform the reverse operation by using the additionally added bytes to restore the removed bytes. By using the base packet, the receiver can then restore the original packet by analysing the base packet and the delta packet, which indicates a change between the original packet and the base packet. It will be appreciated that this process is a lossless compression technique.

In some embodiments, in response to said base packet being updated by said update circuitry, said output circuitry outputs said base packet. The new (updated) base packet itself is output so that future decompression can take place using that base packet. In some embodiments, the base packet is output without being compressed so that future packets can be quickly decompressed themselves, and so that there is a reduced risk of data loss occurring as a result of the base packet being undecipherable.

Although compression can be omitted for the base packet, in some embodiments, in response to said base packet being updated by said update circuitry, said compress circuitry identifies removable base bytes from bytes that make up said base packet, removes said removable base bytes from said base packet, and adds instructional bytes to indicate how said removable base bytes can be restored, to form a compressed base packet, and said output circuitry outputs said compressed base packet. In this way, although a delta packet is not generated for the base packet itself, a certain degree of compression may still be performed.

In some embodiments, said compare circuitry compares said packet to said base packet by performing a XOR operation between said packet and said base packet; and said delta packet indicates a result of said XOR operation. When the resulting delta packet is received by a receiver, a further XOR operation between the delta packet and the basis packet can be performed in order for the original packet to be restored (once any removed bytes have been re-added).

In some embodiments, said compare circuitry compares said packet to said base packet by performing a subtraction operation between said packet and said base packet; and said delta packet indicates a result of said subtraction operation. When the resulting delta packet is received by a receiver, an addition operation can be performed using the delta packet in order for the original packet to be restored (one any removed bytes have been re-added).

In some embodiments, said monitor circuitry monitors a behaviour of processing circuitry in executing a stream of instructions; and said trim circuitry produces said output packet at least as quickly as said processing circuitry executing said stream of instructions. In this way, compression can be performed very quickly, thereby reducing or eliminating the possibility of a backlog of packets generated by the monitoring circuitry.

In some embodiments, said removable bytes are zero-value. In other words, the bytes that are removed from the delta packets are those bytes whose value is zero.

In some embodiments, said one or more triggers comprises a limit trigger in which a number of output packets are generated using a same base packet. After a number of delta packets have been produced using a base packet, it may be appropriate for the base packet to be changed. This can be because, given a particular interval, similarities between data packets become sufficiently different that the delta is large (generating few removable bytes). Additionally, when the packets are received, the packets can be held in a circular buffer. Consequently, after a period of time, under normal operation, the base packet could be lost. Hence, it can be desirable to change the base packet after it has been used a number of times.

In some embodiments, said one or more triggers comprises a number of delta packets each having a number of removable bytes below a threshold value. If a number (e.g. an integer greater than zero) of delta packets are generated where the number of removable bytes is below a threshold (e.g. an integer of at least zero) then it could be concluded that the amount of compression that is taking place is sub-optimal, and this could trigger a change in the basis packet to occur. It would be anticipated that such a change in base packet might lead to better compression taking place, since packets that are generated temporally close to one another might be expected to have similarities (e.g. they might reference the same data structures) and therefore be more compressible.

In some embodiments, said one or more triggers comprises one or more packets being discarded without being output by said output circuitry. Discarding of packets could occur, for instance, in an overflow situation. Various parts of the apparatus such as the output circuitry may have an internal buffer with which a store a queue of packets to be processed. When the buffer fills up, packets may be discarded if there is nowhere left to store them. When this occurs, it could be the case that a base packet itself is discarded. If a base packet is discarded then future delta packets that are generated based on that base packet cannot be decompressed and so the information held in those packets would also be lost, even if they are output. To counteract this, one of the triggers that causes the base packet to be changed (and hence be output) is one or more packets failing to be output by the output circuitry. This might occur, for example, as the consequence of an overflow in a buffer associated with outputting a packet from the apparatus.

In some embodiments, said monitor circuitry is adapted to monitor a behaviour of said processing circuitry while executing a stream of instructions, wherein said stream of instructions is divided into a plurality of blocks and said processing circuitry is adapted to move between execution of said plurality of blocks by execution of a flow control instruction; and said one or more triggers comprises said processing circuitry executing instructions in a different one of said plurality of blocks. The blocks in question could be referred to as logical blocks. The flow control instructions include varieties of branch and jump instructions and instructions that perform operations directly on the program counter. A block of instructions could include, for instance, the instructions within a loop, or between branch instructions in the stream of instructions. Such blocks are often associated with performing related operations and so one might expect data representing the execution of those instructions to be similar. Hence, updating the base packet when such movement between blocks occurs could result in a better compression being achieved.

In some embodiments, said apparatus comprises prediction circuitry to set said number of output packets generated using said same base packet by performing a prediction operation. Consequently, the number of delta packets that are generated before selecting a new basis packet could be adjusted, based on prediction, to improve the compression that can be achieved. Of course, it is possible for this prediction to be limited at an upper end (owing to the use of, for example, circular buffers) so that no matter how high a prediction is occurs, the base packet will be changed after a number of delta packets have been produced.

In some embodiments, said prediction operation analyses a number of delta packets in a previous sequence of delta packets to predict said number of output packets generated using said same base packet; and between each pair of delta packets in said previous sequence of delta packets, said number of removable bytes remains the same or increases. The pairs may be contiguous or continuous. For example, given a sequence of packets A, B, C, D in comparing the number of removable bytes for each packet A<=B<=C<=D.

In some embodiments, each delta packet in said previous sequence of delta packets is produced using a previous base packet. In this way, a prediction is made for how long the current base packet should be used for based on, for a previous base packet, the length of the sequence of delta packets that was produced in which the number of removable bytes remained the same or increased.

In some embodiments, the data processing apparatus comprises: a saturation counter indicating a current state from a plurality of ordered states, wherein said limit trigger has an additional requirement that said current state is one of a subset of said plurality of ordered states; and said saturation counter changes said current state in dependence on how a number of removable bytes between each pair of delta packets in said previous sequence of delta packets changes. The use of a saturation counter can dampen the requirement for a number of contiguous or continuous pairs of delta packets in a sequence to have an increasing number of removable bytes. Consequently, a number of delta packets having fewer removable bytes than the predecessor occurs before the basis is changed. The number in question is dependent on the size of the saturation counter. However, a typical saturation counter could be 2-bit, thereby enabling a maximum of 4 sequential delta bits having fewer removable bytes than their processor before the basis is changed. The saturation counter could move in one direction (discouraging basis change) in response to the number of bytes increasing or remaining the same between continuous or contiguous pairs and could move in the other direction (encouraging basis change) in response to the number of bytes decreasing between continuous or contiguous pairs. In some examples, the ordered states are "strongly change", "weakly change", "weakly retain", "strongly retain". A change could occur with either "strongly change" or "weakly change", provided any other necessary requirements are met for the trigger to fire.

In some embodiments, there is provided a system comprising: an plurality of apparatuses according to claim 1, wherein operation alternate between each apparatus in the plurality of apparatuses. Such a system can be provided to handle the situation in which packets a similar or related packet is produced every N instructions (with N equal to the size of the plurality). For instance, consider a case where N=2 and packets are produced as pairs AB, then packet A and packet B could significantly differ, but packet A could have similarity with a packet C and a packet E and packet B could have similarity with a packet D and a packet F in the sequence: AB, CD, EF. Whereas in previously mentioned embodiments, this would result in every second delta packet having few removable bytes, these embodiments make it possible to track two delta packets and thereby produce a better overall compression rate. It will be appreciated that this can be extended to cover any number of apparatuses, with each apparatus operating in round-robin fashion. Also, in some embodiments, at least some of said monitor circuitry, said compare circuitry, said compress circuitry, output circuitry, and said update circuitry are shared between the plurality of apparatuses. Accordingly, the entirety of the apparatus need not be duplicated each time. Instead, a different set of triggers and/or prediction circuitry (where appropriate) may be all that is needed to be duplicated.

Particular embodiments will now be described with reference to the figures.

Figure 1:
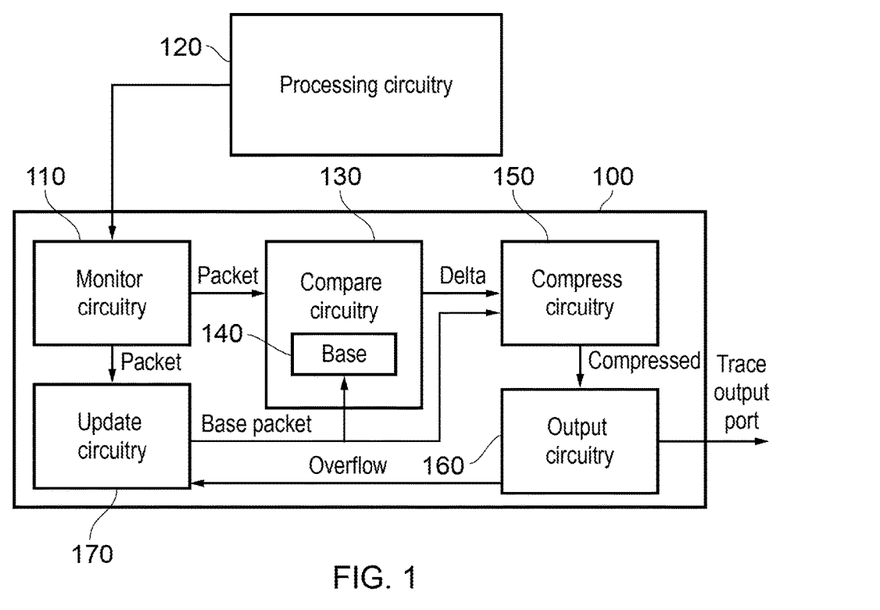
FIG. 1 schematically illustrates an example of a data processing apparatus in accordance with some embodiments.

FIG. 1 schematically illustrates an example of a data processing apparatus 100 in accordance with some embodiments. The data processing apparatus includes monitor circuitry 110, which monitors behaviour of a processing circuitry 120. In this embodiment, the processing circuitry executes a number of instructions. During the execution of those instructions various internal state changes occur to the processing circuitry 120, and a number of different operations, sub-operations and/or micro-operations occur. The monitoring circuitry is able to detect these, and output trace data packets that provide information on what is happening within the processing circuitry 120. Compare circuitry 130 stores a base packet in base packet storage circuitry 140 and a delta packet is produced. The delta packet is provided to compress circuitry 150 that removes bytes from the delta packet having a particular characteristic. In this example, the characteristic is that the bytes have a zero-value. Consequently, zero-value bytes are removed from the delta packet. At the same time, bytes that are necessary to reinsert the zero-value bytes into the packet are provided. These bytes might, for instance, indicate the locations of each of the zero-value bytes that are removed. The result is these operations is referred to as a compressed packet, and is provided to the output circuitry 160, which outputs the compressed packet to a trace output port. During this process, update circuitry 170 may cause the base packet stored in the base packet storage circuitry 140 to be updated. When this happens, the base packet itself is passed to the compress circuitry 150, which generates a compressed base packet, which is then output by the output circuitry 160. The update circuitry 170 is made to update the base packet stored in the base packet storage circuitry 140 as a result of one of a plurality of triggers firing. In this case, one such trigger is shown. In particular, the output circuitry 160 is able to assert an Overflow signal to the update circuitry 170 if the buffer in the output circuitry 160 overflows. When this occurs, it is possible that the base packet itself will be lost. Such a situation would cause subsequent packets compressed using that base packet to be undecipherable, since the base packet will not have been received by the receiver. To inhibit this loss of data, the Overflow signal causes a new base packet to be chosen, which is then sent to be output. Although this may not address the cause of the overflow, it can limit any damage caused by undecipherable packets being received.

It will be appreciated that when there is no base packet in the base packet storage circuitry 140, the first packet obtained by the monitor circuitry 110 will become the base packet and therefore will be compressed and output.

Figure 2:
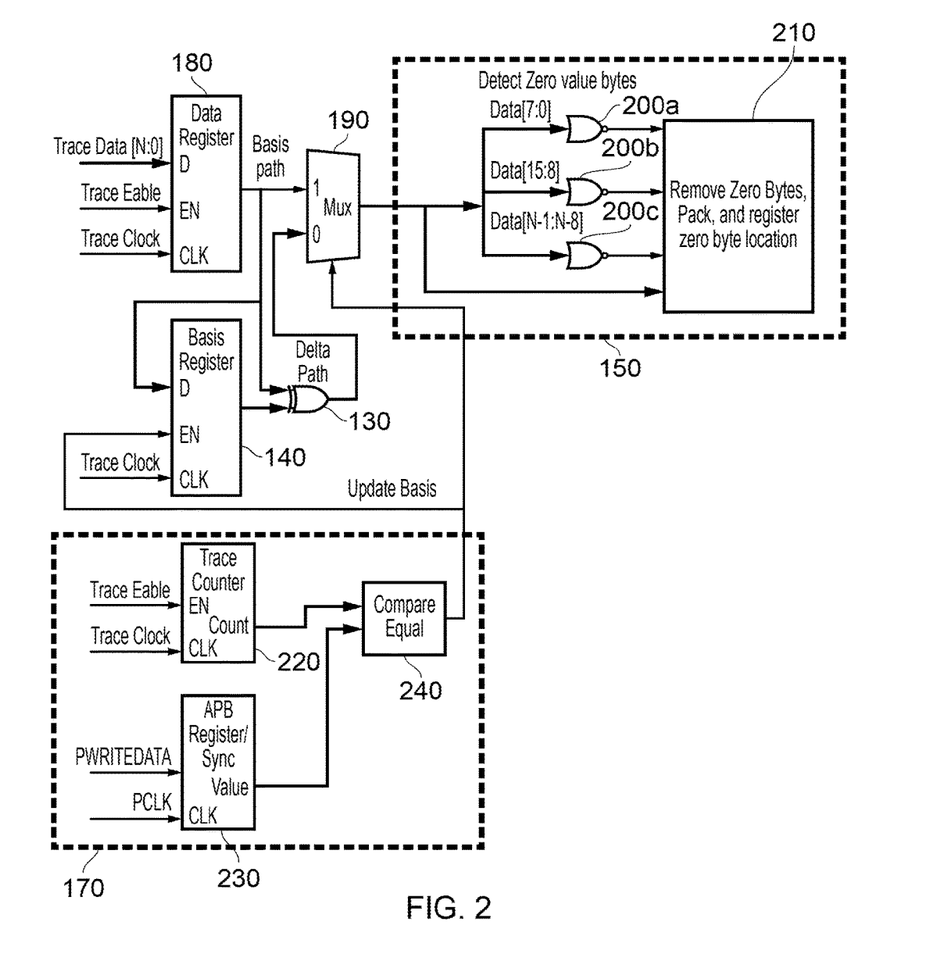
FIG. 2 illustrates a circuit diagram illustrating a data processing apparatus in accordance with some embodiments.

FIG. 2 illustrates a circuit diagram illustrating a data processing apparatus 100 in accordance with some embodiments. A data register 180 receives the trace data as well as a Trace Eable signal, which causes the trace to be generated, and a trace clock signal, which clocks components within the data processing apparatus. Base packet storage circuitry 140 captures this value as the new basis value in response to a signal (Update Basis). The data value is also provided to a multiplexer 190. In this example, the compare circuitry 130 takes the form of a XOR gate, which performs a XOR between the current base packet and the data value. In other embodiments, a subtraction may be performed. The result from the compare circuitry 130 is provided as a second input to the multiplexer 190. The select signal to the multiplexer 190 is the Update Basis signal. Consequently, the multiplexer 190 outputs either the data packet that is to be captured by the base packet storage circuitry 140 or the delta packet produced by the compare circuitry 130, to compress circuitry 150. Within the compress circuitry 150, each 8 bits (byte) of the output of the multiplexer 190 is passed to a NOR gate 200a, 200b, 200c. Each NOR gate 200a, 200b, 200c returns, for each 8 bits (byte), a value of '1' if all of the bits are 0 and a '0' otherwise. By adding up the total of the outputs from the NOR gates 200a, 200b, 200c, it is possible to determine a number of zero-value bytes in the output of the multiplexer 190. This is then passed to a unit that handles the removal of the zero-value bytes and the addition of data necessary to restore the zero-value bytes. This result (an output packet) can then be provided to output circuitry.

Within the update circuitry 170 of the embodiment of FIG. 2 is a trace counter 220. The trace counter counts the number of output packets that are output. In addition, a storage element 230 is used to store a current threshold value. In particular, a PWRITEDATA signal is used to store a new value in the storage element 230, which is clocked by a PCLK signal. Comparison circuitry 240 is used to compare the value in the trace counter 220, which indicates the number of output packets that have been output with the value stored in the storage element. When these values are equal, the Update Basis signal is asserted. In this way, one of the triggers that causes the base packet to be changed is a threshold number of output packets being output.

This process can result in a degree of compression being achieved. Furthermore, the circuitry can be implemented in a relatively simple manner such that it is able to operate at the rate in which data packets are produced from processing circuitry 120. In this way, there is less chance of an overflow occurring, which might cause data to be lost. However, the threshold value is not customised. By customising the threshold value based on the data itself, and by performing predictions as to when it will be advantageous to change the base packet, a higher level of compression could be achieved.

Figure 3:
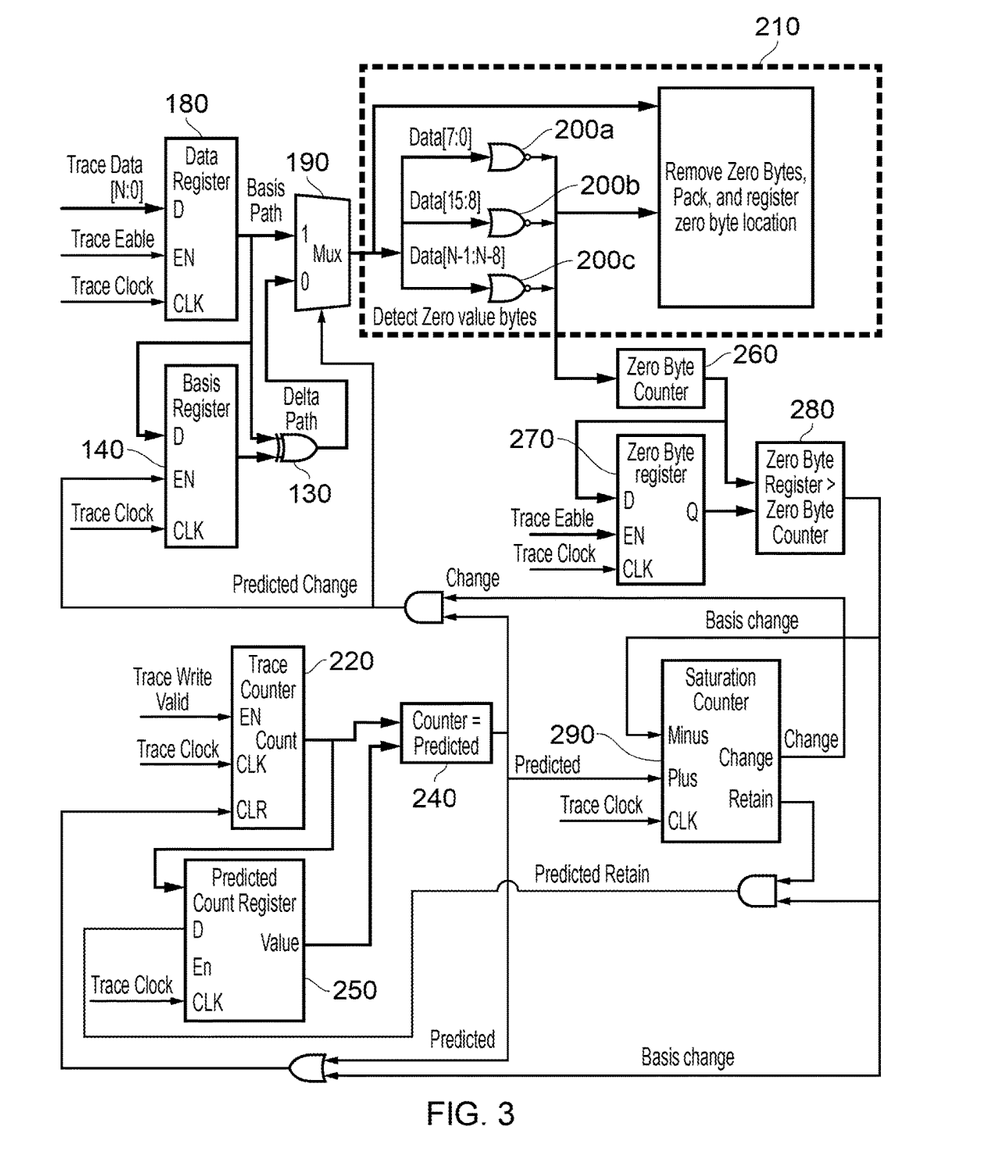
FIG. 3 shows circuitry in which the threshold number of packets that are output before the basis is changed is predicted based on past behaviour.

FIG. 3 shows circuitry in which the threshold number of packets that are output before the basis is changed is predicted based on past behaviour. A trace counter 220 counts the number of output packets that have been output without a change of base packet being desired. This is compared by comparison circuitry 240 to a value provided by prediction circuitry 250, which predicts when a change in base packet is most appropriate. Hence, when the two values are equal as determined by the comparison circuitry 240, a Predicted signal is asserted. In practice, both the Predicted signal and a Change signal must be asserted for the basis to be changed at the base packet storage circuitry 140. The desire for a basis change is determined by a zero byte counter 260, which counts the number of zero-value bytes in a delta packet. This is compared by comparison circuitry 280 to the number of zero-value bytes found in the preceding delta packet, which is stored in the zero byte register 270. When the previous value is greater than the current count, a Basis change signal is asserted, indicating that a change in basis is desirable. Both the Basis change signal and the Predicted signal cause the trace counter 220 to be reset. Rather than immediately cause the base packet to be changed, a saturation counter 290 is provided. In this embodiment, the saturation counter has 4 states. From lowest to highest, these are: Strongly retain, weakly retain, weakly change, strongly change. Within these states, a current counter value can be reduced (as a consequence of the Basis change signal being asserted) or increased (as a consequence of the Predicted signal being asserted). When the current counter is one of the change states, the Change signal is asserted. When asserted together with the Predicted signal, the basis stored in the packet storage circuitry 140 is changed to the current packet provided by the data register 180. When the current counter is one of the retain states, a signal is asserted that, when asserted along with the Basis change signal, causes a Predicted Retain signal to be asserted, which causes the predicted count register 250 to store the current value in the trace counter 220, effectively setting a new Predicted count. In this way, the number of packets that are output before needing a basis change is updated.

The saturation counter 290 has the effect of dampening the change of the predicted count register. In particular, although it could be desirable to change the basis if delta packets suddenly start producing fewer zero-value bytes, this could result in rapidly changing the base packet, which could lead to poor compression. The saturation counter 290 therefore provides a degree of tolerance such that occasional packets where fewer zero-value bytes are permitted. Another situation that can arise is that a delta packet could arise in which the number of zero-value bytes suddenly increases. In this case, the basis would not be immediately updated if the saturation counter is in one of the retain states. It will be appreciated that frequent updates of the basis can reduce the overall compressed achieved since sending the new base packet can occupy significantly more bytes than a delta packet. Hence, the saturation counter can be used in order to limit such behaviour. The saturation counter can have any starting value. For example, the saturation counter could start at one of the 'weak' states so that a large change is not needed in order to move the saturation counter to an appropriate state.

In this way, the rate at which the base packet is changed can altered based on previous behaviour of the data processing apparatus.

It will be appreciated that the embodiments shown in FIGS. 2 and 3 can be combined so that the base packet is changed based on predictions, but is also limited to a maximum value.

Note that in some embodiments, it could be necessary to handle latency in determining that a number of zero-value bytes has decreased and that a change in base packet is desired. In particular, trace packets could be generated every cycle (e.g. if the trace data relates to a burst of data reads on a bus). However, they could occur in a pattern of more than two cycles (e.g. if the trace data relates to read request addresses). In yet other cases, there could be a combination of these, which can result in delayed trace writes. Consequently, there could gaps (latencies) in the embodiment shown in FIG. 3. In particular, certain components in the embodiment of FIG. 3 are needed to hit processor frequencies. Component latencies become a problem when a trace packet is produces on every clock cycle. For example, the output pattern could be: data 0, data 1, data 2, data 3, no data, no data, data 4, data 5, data 6, data 7, no data, data 8, no data, data 9. In the example of FIG. 3, the comparator 280 could be two cycles behind, and so the comparison circuitry 240 would be changed to counter=predicted−2.

The cycle latencies should be accounted for when trace data packets are being produced in consecutive clock cycles. Without compensating for this situation, compression is still possible, but due to the unnecessary rotation of base packet, a lesser compression is generally achieved. A number of changes can be made to compensate for such latencies. For example, the predicted count register 250 can be decreased by a value equal to the latency. The comparison circuitry 240 could also subtract this value when performing the analysis each cycle, e.g. counter=predicted−latency. At the same time, the saturation counter 290 should not allow consecutive cycle decrements as a result of consecutive trace writes. Consequently, if the maximum latency is two, then the next decrement can occur two cycles later. Finally, a way is needed to detect when the above changes should occur. This can be achieved by providing a cycle counter in parallel with the trace counter. If cycle count=trace count then latency must be accounted for, since this indicates a trace write is occurring every processor cycle.

Figure 4:
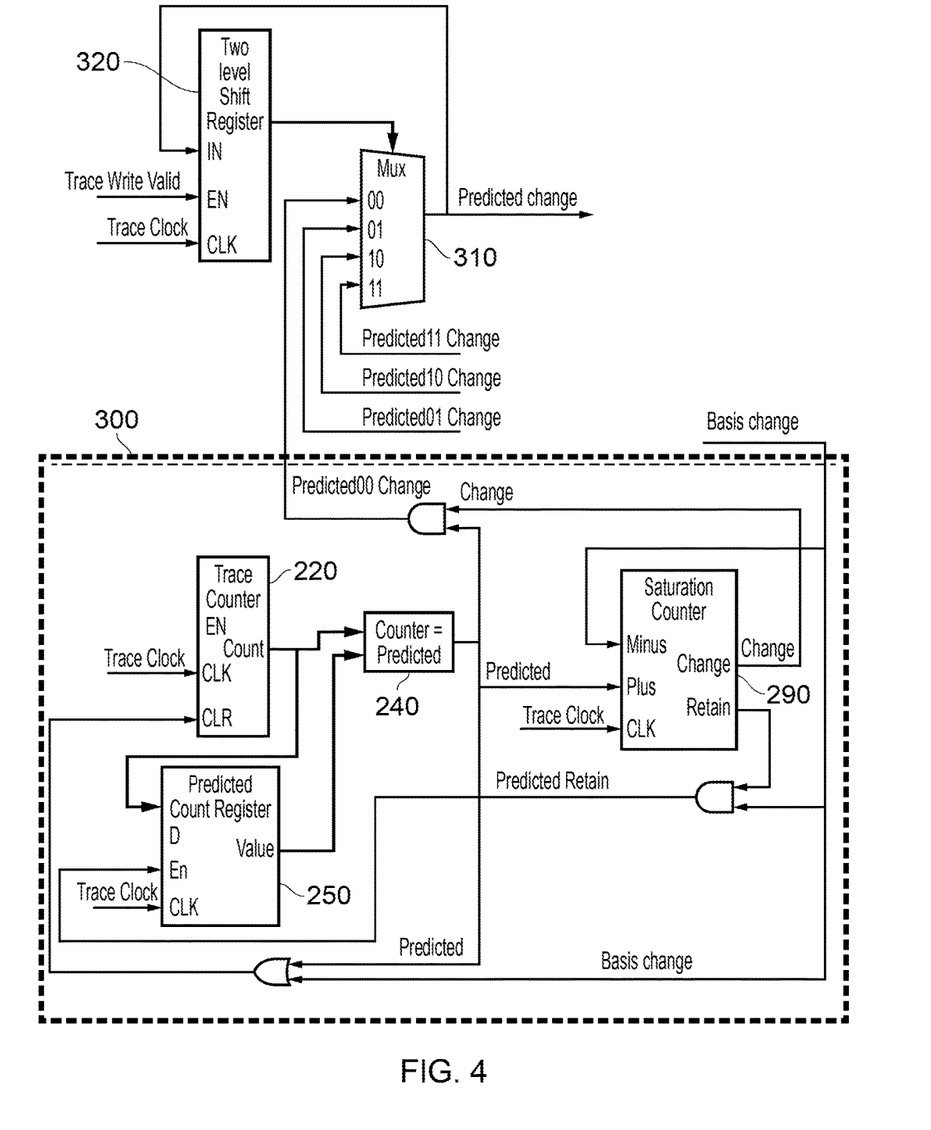
FIG. 4 shows a number of prediction circuits 300 being provided in accordance with some embodiments.

FIG. 4 shows a number of prediction circuits 300 being provided in accordance with some embodiments. Each prediction circuit 300 includes the trace counter 220, comparison circuitry 240, predicted count register 250, and saturation counter 290 previously described. However, each prediction circuit 300 takes it in turn to be used on each delta packet. Each prediction circuit 300 outputs a different Predicted Change signal (Predicted00 Change, Predicted01 Change, Predicted10 Change, Predicted11 Change). These are provided to a multiplexer 310 to select the appropriate signal based on the current order. The selection signal is provided by a two level shift register 320 that receives an input signal corresponding to when a valid trace write occurs. In this way, it is possible to use a number of base packets. This could be appropriate, for example, when trace packets are received in groups, with each group having a repeating pattern. By using multiple base packets, it is possible to achieve good compression when such a sequence occurs.

As before, it will be appreciated that the features shown in the embodiment of FIG. 4 can be combined with the features of FIG. 2 and/or FIG. 3.

Figure 5:
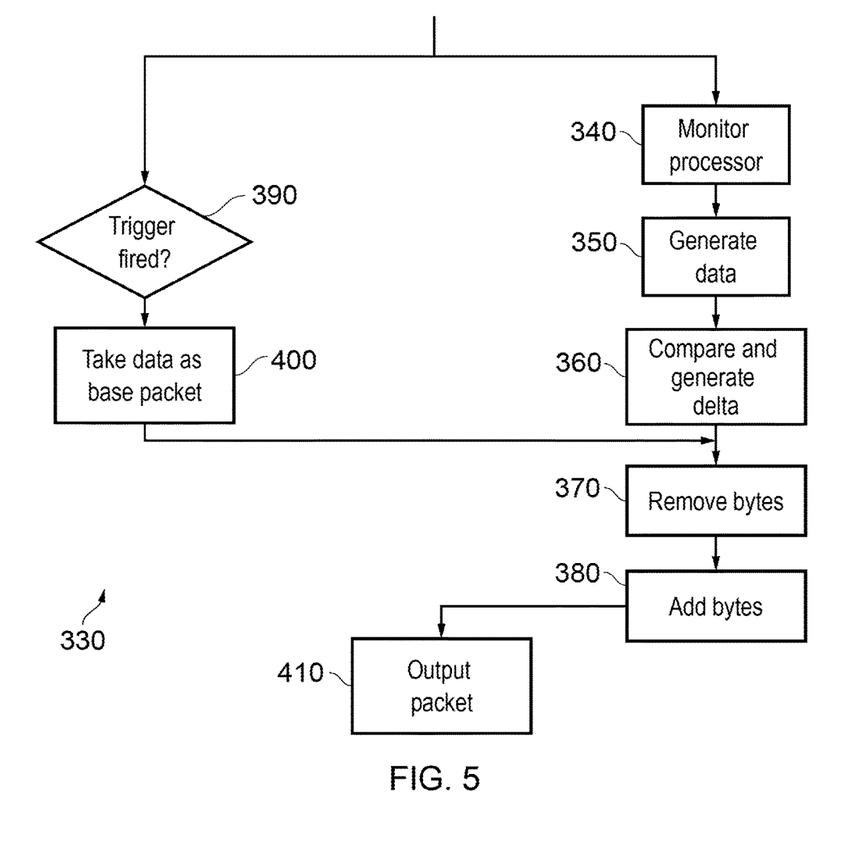
FIG. 5 shows a flow chart that illustrates a method of data processing in accordance with some embodiments.

FIG. 5 shows a flow chart 330 that illustrates a method of data processing in accordance with some embodiments. In a step 340, the behaviour of a processing circuitry (e.g. a processor) is monitored. In a step 350, as a consequence of that monitoring, a data (trace) packet is generated. At step 360, the data (trace) packet is compared to a base packet and a delta packet is generated (e.g. by a XOR or subtraction operation). At step 370, those bytes that are in the delta packet that have a predetermined characteristic (e.g. are zero-value bytes) are removed and at step 380, bytes that indicate how to restore the removed bytes are added.

During this process, it may be determined at a step 390 that a trigger has fired. At that point, at step 400, the current data packet is taken as the new base packet. Flow then proceeds to step 370 where particular bytes are removed and step 380 where further bytes are added, and flow then proceeds to step 410 where the result is output. Of course, in some embodiments, steps 370 and 380 may be forgone for new base packets.

It will be appreciated that, although not shown in this flow chart, a relative ordering of packets is preserved. In particular, once the base packet is changed and output, either further packets cannot be output that have been generated using the old base packet or (in other embodiments) such packets can be output, but have an indicator to indicate which basis packet they were produced using.

In this particular embodiment, the updating of the base packet is performed in parallel with the generation of the delta packet. However, in other embodiments, parallelisation is not necessary and the update can be performed serially—either before or after the generation of the trace data packet.

As has been illustrated via the embodiments above, by the use of a base packet to generate a delta packet, from which bytes are subsequently removed, it is possible to produce smaller packets, which therefore achieves a good degree of compression. Such implementations can be provided using a small set of hardware that operates quickly (e.g. more quickly that the processor circuitry on whose behaviour the trace data packets are generated). As a consequence, the compression is able to keep up with the data trace packets that are produced, which may not be possible with more complex compression algorithms.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus comprising:
   monitor circuitry to monitor a behaviour of processing circuitry and to generate at least a packet indicating said behaviour;
   compare circuitry to compare said packet to a base packet and to generate a delta packet based on said comparison;
   compress circuitry to form a compressed packet on the basis of said delta packet;
   output circuitry to output said compressed packet; and
   update circuitry to update said base packet in dependence on one or more triggers.

2. An apparatus according to claim 1, wherein
   said compress circuitry is adapted to identify removable bytes from bytes that make up said delta packet, to remove said removable bytes, and to add instructional bytes to indicate how said removable bytes can be restored, to form said compressed packet.

3. An apparatus according to claim 1, wherein
   in response to said base packet being updated by said update circuitry, said output circuitry outputs said base packet.

4. An apparatus according to claim 1, wherein
   in response to said base packet being updated by said update circuitry, said compress circuitry identifies removable base bytes from bytes that make up said base packet, removes said removable base bytes from said base packet, and adds instructional bytes to indicate how said removable base bytes can be restored, to form a compressed base packet, and said output circuitry outputs said compressed base packet.

5. An apparatus according to claim 1, wherein
   said compare circuitry compares said packet to said base packet by performing a XOR operation between said packet and said base packet; and
   said delta packet indicates a result of said XOR operation.

6. An apparatus according to claim 1, wherein
   said compare circuitry compares said packet to said base packet by performing a subtraction operation between said packet and said base packet; and
   said delta packet indicates a result of said subtraction operation.

7. An apparatus according to claim 1, wherein
   said monitor circuitry monitors a behaviour of processing circuitry in executing a stream of instructions; and
   said output circuitry is configured to produce said compressed packet at least as quickly as said processing circuitry executing said stream of instructions.

8. An apparatus according to claim 1, wherein
   said removable bytes are zero-value.

9. An apparatus according to claim 1, wherein
   said one or more triggers comprises a limit trigger in which a number of output packets are generated using a same base packet.

10. An apparatus according to claim 1, wherein
    said one or more triggers comprises a number of delta packets each having a number of removable bytes below a threshold value.

11. An apparatus according to claim 1, wherein
said one or more triggers comprises one or more packets being discarded without being output by said output circuitry.

12. An apparatus according to claim 1, wherein
said monitor circuitry is adapted to monitor a behaviour of said processing circuitry while executing a stream of instructions, wherein said stream of instructions is divided into a plurality of blocks and said processing circuitry is adapted to move between execution of said plurality of blocks by execution of a flow control instruction; and
said one or more triggers comprises said processing circuitry executing instructions in a different one of said plurality of blocks.

13. An apparatus according to claim 9, comprising:
prediction circuitry to set said number of output packets generated using said same base packet by performing a prediction operation.

14. An apparatus according to claim 13, wherein
said prediction operation analyses a number of delta packets in a previous sequence of delta packets to predict said number of output packets generated using said same base packet; and
between each pair of delta packets in said previous sequence of delta packets, said number of removable bytes remains the same or increases.

15. An apparatus according to claim 14, wherein
each delta packet in said previous sequence of delta packets is produced using a previous base packet.

16. An apparatus according to claim 14, comprising:
a saturation counter indicating a current state from a plurality of ordered states, wherein
said limit trigger has an additional requirement that said current state is one of a subset of said plurality of ordered states; and
said saturation counter changes said current state in dependence on how a number of removable bytes between each pair of delta packets in said previous sequence of delta packets changes.

17. A system comprising:
an plurality of apparatuses according to claim 1, wherein
operation alternate between each apparatus in the plurality of apparatuses.

18. A system according to claim 17, wherein
at least some of said monitor circuitry, said compare circuitry, said compress circuitry, said output circuitry, and said update circuitry are shared between the plurality of apparatuses.

19. A method comprising:
monitoring a behaviour of processing circuitry;
generating at least a packet indicating said behaviour;
performing a comparison between said packet and a base packet;
generating a delta packet based on said comparison;
compressing said delta packet to form a compressed packet;
outputting said compressed packet; and
updating said base packet in dependence on one or more triggers.

20. An apparatus comprising:
means for monitoring a behaviour of processing circuitry;
means for generating at least a packet indicating said behaviour;
means for performing a comparison between said packet and a base packet;
means for generating a delta packet based on said comparison;
means for compressing said delta packet to form a compressed packet;
means for outputting said compressed packet; and
means for updating said base packet in dependence on one or more triggers.

* * * * *